US007230958B2

(12) United States Patent
Chang et al.

(10) Patent No.: US 7,230,958 B2
(45) Date of Patent: Jun. 12, 2007

(54) RAMAN AMPLIFIER AND RAMAN PUMPING METHOD

(75) Inventors: Sun Hyok Chang, Daejeon (KR); Hee Sang Chung, Daejeon (KR); Jin Soo Han, Daejeon (KR); Ji Sung Jung, Daejeon (KR); Heuk Park, Daejeon (KR); Won Kyoung Lee, Busan (KR); Hyun Jae Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/835,225

(22) Filed: Apr. 28, 2004

(65) Prior Publication Data

US 2005/0122570 A1 Jun. 9, 2005

(30) Foreign Application Priority Data

Oct. 8, 2003 (KR) ..................... 10-2003-0070042

(51) Int. Cl.
*H01S 3/30* (2006.01)

(52) U.S. Cl. ..................................... 372/3; 359/341.33

(58) Field of Classification Search ................ 359/334, 359/341.3, 341.33; 372/3, 6

See application file for complete search history.

(56) References Cited

U.S. PATENT DOCUMENTS 5,694,408 A * 12/1997 Bott et al. ..................... 372/6
6,704,134 B2 * 3/2004 Yokoyama .................. 359/334
6,728,437 B2 * 4/2004 Edagawa et al. ............. 385/27
6,741,390 B2 * 5/2004 Onaka et al. ............... 359/334
6,782,028 B2 * 8/2004 Tsukiji et al. ............ 372/50.22
6,839,375 B1 * 1/2005 Lokai et al. .................. 372/92
6,950,230 B2 * 9/2005 Kado et al. ................. 359/334
7,133,192 B2 * 11/2006 Tanaka et al. .............. 359/334
2002/0085268 A1 7/2002 Zarris et al. .................. 372/31

FOREIGN PATENT DOCUMENTS

JP 09-232662 9/1997
JP 2002-006349 1/2002

OTHER PUBLICATIONS

Wednesday Morning/ OFC 2002/ pp. 183-184.
Optics Letters / vol. 27, No. 8, Apr. 15, 2002, pp. 592-594.

* cited by examiner

*Primary Examiner*—Douglas W. Owens
*Assistant Examiner*—Jimmy Vu
(74) *Attorney, Agent, or Firm*—Blakely Sokoloff Taylor & Zafman

(57) ABSTRACT

Provided are a Raman amplifier and a Raman pumping method. A light source unit outputs a pumping light having a wavelength that periodically changes. A light intensity control unit varies a light intensity of the pumping light using the pumping light to improve the gain flatness of a Raman gain. A control unit directs the light intensity control unit to control the light intensity of the pumping light in synchronization with changes in the wavelength of the pumping light.

4 Claims, 4 Drawing Sheets

100
110
SIGNAL
OPTICAL COUPLER
SIGNAL
PUMP
120
RAMAN PUMPING MODULE
126
OPTICAL DETECTION UNIT
tap
125
PUMP
124
128
LIGHT INTENSITY CONTROL UNIT
CONTROL UNIT
PUMP
122
LIGHT SOURCE UNIT

RAMAN AMPLIFIER AND RAMAN PUMPING METHOD

CROSS REFERENCE TO RELATED APPLICATION

This application claims the priority of Korean Patent Application No. 2003-70042, filed on Oct. 8, 2003, in the Korean Intellectual Property Office, the disclosure of which is hereby incorporated by reference in its entirety.

BACKGROUND OF THE INVENTION

1. Field of the Invention

The present invention relates to a Raman amplifier of a wavelength division multiplexing (WDM) optical transmission system.

2. Description of the Related Art

In large-capacity WDM optical transmission systems, erbium-doped fiber amplifiers (EDFA) and Raman amplifiers are used to obtain a broad gain bandwidth and a small noise figure.

The Raman amplifiers couple outputs from pump lasers of several different wavelengths using WDM optical couplers, send the coupled outputs from the pump lasers to optical fibers that is transmission paths, and amplify signal light.

Raman amplifiers use a plurality of pump lasers of different wavelengths to get good Raman gain flatness in a signal bandwidth. However, since pump lasers of different wavelengths generate Raman interaction with one another, the pump laser of the shortest wavelength requires an output much higher than the other pump lasers. Also, four-wave mixing may occur among the pump lasers wavelengths in a specific other transmission fiber type.

C. R. S. Fludger suggests a time division multiplexing (TDM) method in his paper “Novel Ultra-broadband High Performance Distributed Raman Amplifier Employing Pump Modulation” (OFC2002, WB4, pp. 183–184 (2002)). In the TDM method, pump lasers of different wavelengths are sequentially turned on and off over time in turn. Therefore, the pump lasers of difference wavelengths do not overlap in the fiber. The TDM method eliminates Raman interactions among pump lasers of different wavelengths, but requires many pump lasers of different wavelengths like conventional Raman amplifiers.

L. F. Mollenauer demonstrates in his paper “Time-Division Multiplexing of Pump Wavelengths to Achieve Ultra-broadband, Flat, Backward-Pumped Raman Gain” (Optics Letters, vol 27, pp. 595 (2002)) that it is possible to effectively design a Raman amplifier having a broad gain bandwidth and superior gain flatness using a single pump laser that has the features of a changeable and tunable wavelength.

When wavelengths of pump lasers change, contribution to Raman gain at each of the wavelengths is controlled by changing the duration of each of the wavelengths. In the paper, outputs from pump lasers are assumed to remain constant when the wavelengths of the pump lasers are changed. However, in practice, there is no pump laser whose output remains constant when the wavelength of the pump laser changes. Also, since a change in wavelength affects laser dynamics, outputs from pump lasers become unstable or transient phenomena occur when the wavelengths of the pump lasers change.

SUMMARY OF THE INVENTION

The present invention provides a Raman amplifier to obtain a flat Raman gain in a wide signal bandwidth.

The present invention also provides a Raman pumping method to obtain a flat Raman gain over a wide signal bandwidth.

Refer to claims.

Accordingly, it is possible to obtain a flat Raman gain spectrum in a wide signal bandwidth.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
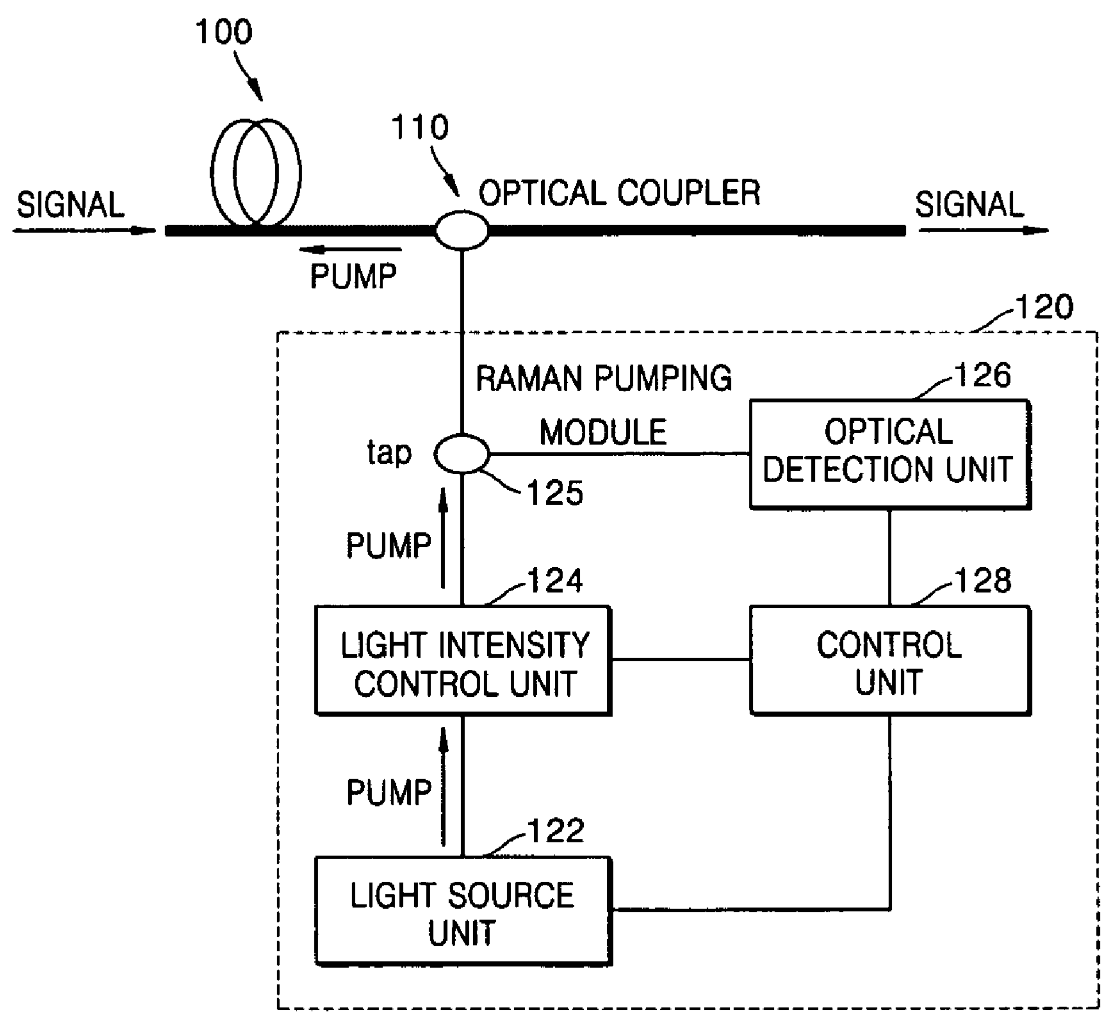
FIG. 1 illustrates a Raman amplifier including a Raman pumping module according to the present invention.

The present invention will now be described more fully with reference to the accompanying drawings, in which embodiments of the invention are shown. Throughout the drawings, like reference numerals are used to refer to like elements.

FIG. 1 illustrates a Raman amplifier according to the present invention.

Referring to FIG. 1, the Raman amplifier includes a Raman pumping module 120 and an optical coupler 110. The Raman pumping module 120 includes a light source unit 122, a light intensity control unit 124, a tap 125, a light detection unit 126, and a control unit 128.

A signal light travels in the direction indicated by arrows through a transmission optical fiber 100. The optical coupler 110 transmits a pumping light output from the Raman pumping module 120 in the opposite direction to the signal light. The signal light that travels through the transmission optical fiber 100 obtains a Raman gain using the pumping light transmitted in the opposite direction. The Raman pumping module 120 will later be described with reference to FIGS. 4 and 5.

Figure 2:
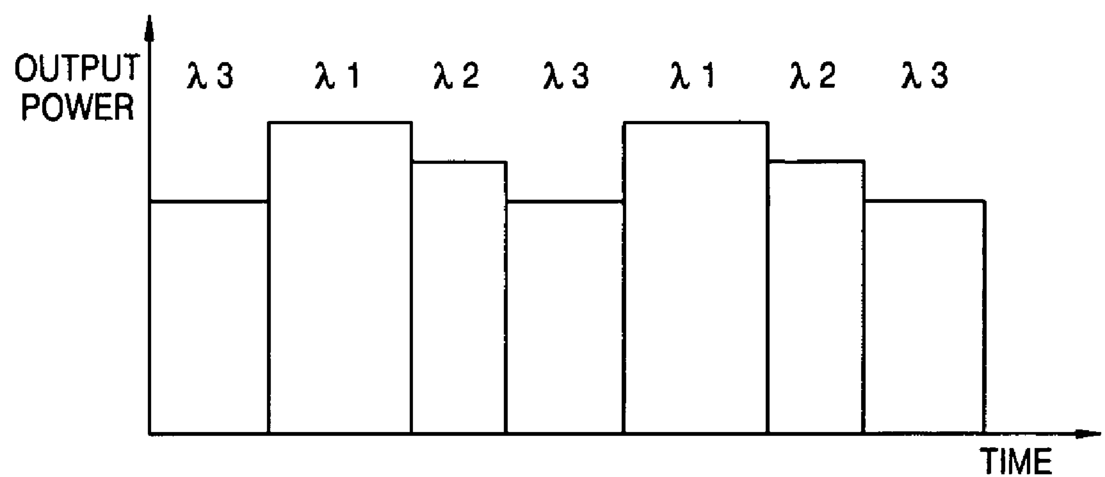
FIG. 2 illustrates changes in the output from the Raman pumping module over time according to a TDM pumping method.

FIG. 2 illustrates changes in the output from the Raman pumping module 120 over time according to a TDM pumping method.

Referring to FIG. 2, pump lasers of different wavelengths are sequentially turned on and off over time. For example, pump lasers of three wavelengths $\lambda_1$, $\lambda_2$, and $\lambda_3$ are sequentially turned on and off. In other words, while a pump laser of a particular wavelength is operating, pump lasers of the remaining wavelengths are turned off. Since the wavelength output from the pump lasers changes over time, Raman interactions among the pump lasers of different wavelengths are removed.

Since the signal light travels in the opposite direction to the pumping light, the signal light that travels through an optical line obtains a Raman gain using pumping lights of any wavelength. To make gain flatnesses equal in a gain bandwidth, the output powers of pump lasers of different wavelengths are controlled differently and the durations during which the pump lasers are turned on are controlled for each of the different wavelengths.

As described with reference to FIG. 2, by changing wavelengths over time, the Raman interactions among the pumping lights can be removed and a flat Raman gain can be obtained. However, the Raman pumping module 120 according to the TDM pumping method requires several pump lasers.

Figure 3A:
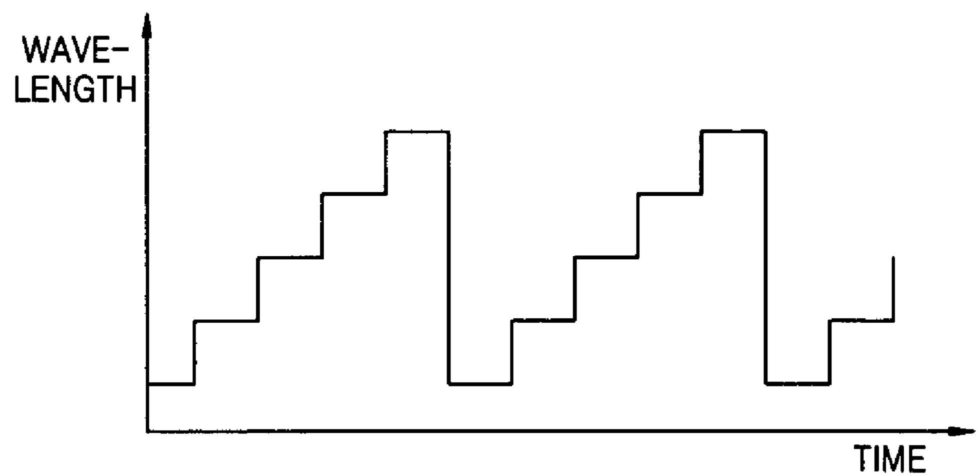
FIGS. 3A and 3B illustrate examples of periodical changes in wavelength with respect to time of pumping lights.
Figure 3B:
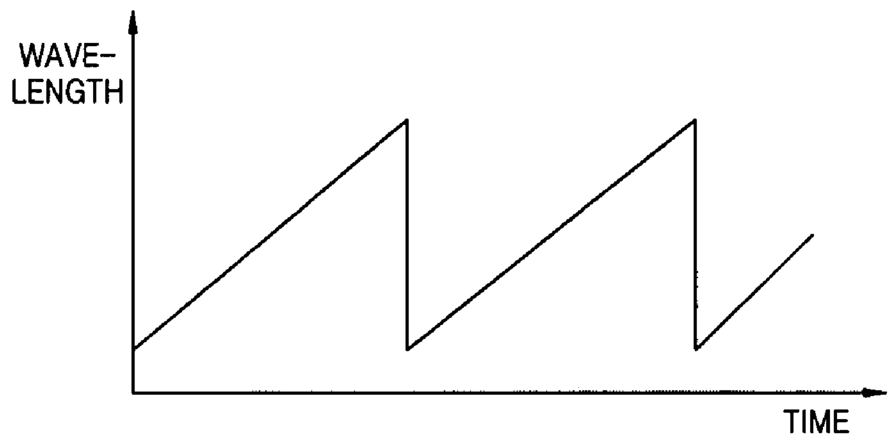

FIGS. 3A and 3B illustrate examples of periodical changes in wavelength over time of pumping lights.

Referring to FIG. 3A, the wavelength of a pumping light shows a periodical stepwise change over time. Referring to FIG. 3B, the wavelength of a pumping light shows continuous changes over time. When using a single pump laser with a wavelength that changes over time as described in FIGS. 3A and 3B, it is possible to remove the Raman interactions and obtain a flat Raman gain.

In general, the output power of a pump laser depends on the wavelength of the pump laser. Also, contribution to Raman gain at each of the wavelengths should be controlled to obtain a flat Raman gain over a signal bandwidth. A configuration for this will be described in detail with reference to FIG. 4.

Figure 4:
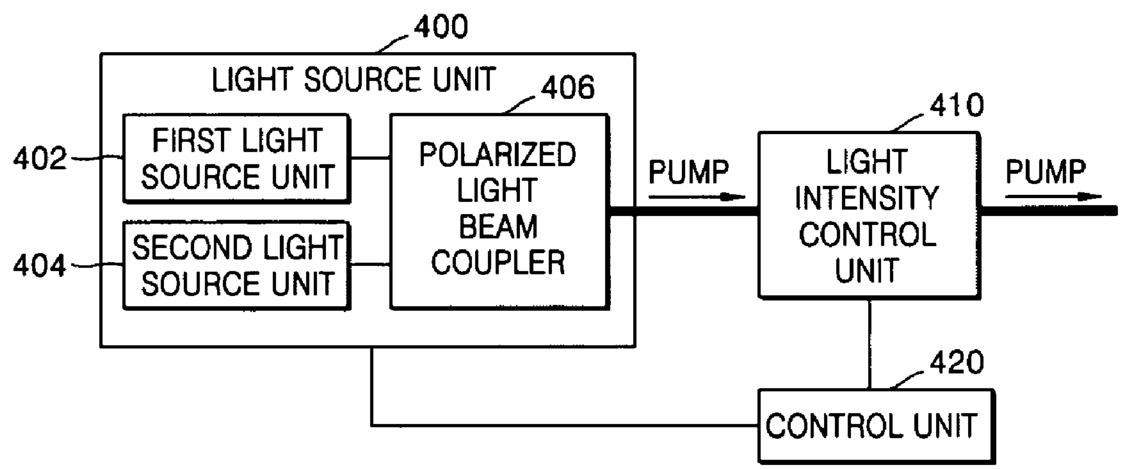
FIG. 4 illustrates a Raman pumping module according a first embodiment of the present invention.

FIG. 4 illustrates the Raman pumping module according to a first embodiment of the present invention.

Referring to FIG. 4, the Raman pumping module includes a light source unit 400, a light intensity control unit 410, and a control unit 420.

The light source unit 400 uses a pump laser of a wavelength that changes continuously or discretely over time within the predetermined range of wavelength. Exemplary outputs from a pump laser are shown in FIGS. 3A and 3B. In other words, the light source unit 400 outputs a pumping light with a wavelength that periodically changes.

The light source unit 400 may include a single pump laser with a wavelength that periodically changes or two pump lasers with wavelengths that periodically change. When the light source unit 400 includes two pump layers, the light source 400 includes a first light source 402, a second light source 404, and a polarized light beam coupler 406.

The first light source 402 outputs a first pumping light with a wavelength that periodically changes. The second light source 404 outputs a second pumping light with a wavelength that is the same as that of the first pumping light but is orthogonally polarized. The polarized light beam coupler 406 couples the first pumping light and the second pumping light and outputs a pumping light of unpolarized light. The pumping light of unpolarized light can remove dependency of Raman gain on the polarization.

The light intensity control unit 410 controls the light intensity of the pumping light output from the light source unit 400 of each wavelength. Since the output power of the pumping light changes with wavelength, the light intensity should be controlled for each wavelength to obtain a flat Raman gain over a signal bandwidth. In general, the light intensity control unit 410 controls the light intensity using an optical attenuator such that a suitable pump power is obtained for the pumping light of each wavelength.

The control unit 420 senses a change in the output power of the pumping light output from the light source 400. The control unit 420 controls the light intensity control unit 410 to vary the light intensity of the pumping light in synchronization with changes in the wavelength of the pumping light.

The pumping light with the light intensity controlled for each wavelength by the light intensity control unit 410 is transmitted from the optical coupler 110 of FIG. 1 through the transmission optical fiber 100 of FIG. 1 in the opposite direction to the signal light. The signal light obtains flat Raman gain in the signal bandwidth by the transmitted pumping light.

Figure 5:
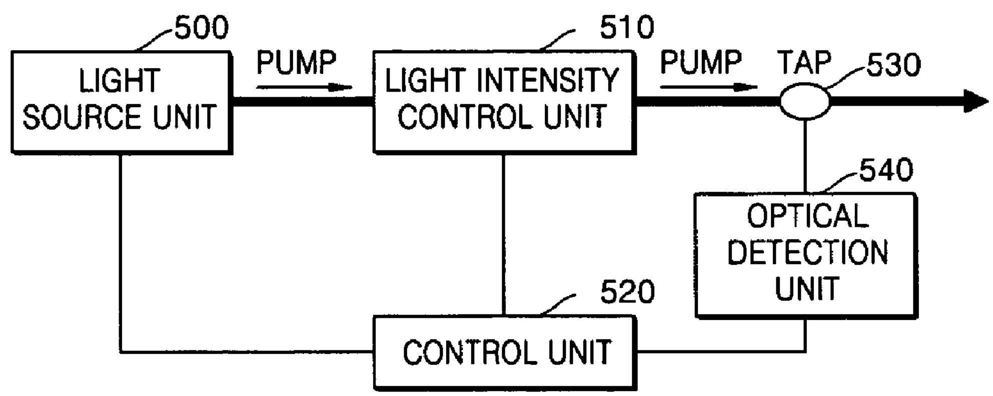
FIG. 5 illustrates a Raman pumping module according to a second embodiment of the present invention.

FIG. 5 illustrates the Raman pumping module according to a second embodiment of the present invention.

Referring to FIG. 5, the Raman pumping module includes a light source unit 500, a light intensity control unit 510, a control unit 520, a tap 530, and an optical detection unit 540. The configuration and operation of the light source unit 500 are the same as those of the light source 400 of FIG. 4 and will not be described here.

The tap 530 splits a portion of the pumping light output from the light intensity control unit 510. The split portion is output to the optical coupler 110 and the remaining portion is output to the optical detection unit 540.

The optical detection unit 540 detects the pumping light offer the portion of light has been split from it by the tap 530. More specifically, the light detection unit 540 outputs an electric signal (voltage or current) corresponding to the intensity of the input pumping light. The output electric signal is input to the control unit 520.

The control unit 520 senses changes of the wavelength in the light source unit 500. The control unit 520 directs the light intensity control unit 510 to control the light intensity of the pumping light for each wavelength in synchronization with changes of the wavelength of the pumping light.

Also, the control unit 520 controls the light intensity control unit 510 to vary the light intensity of the pumping light based on the input electric signal from the light detection unit 540. Through these feedback processes, it is possible to improve control performed by the light intensity control unit 510 on the light intensity of pumping light at each wavelength.

The light intensity control unit 510 varies the light density of the pumping light according to the control signal of the control unit 520, in synchronization with changes in the wavelength of the pumping light.

Figure 6:
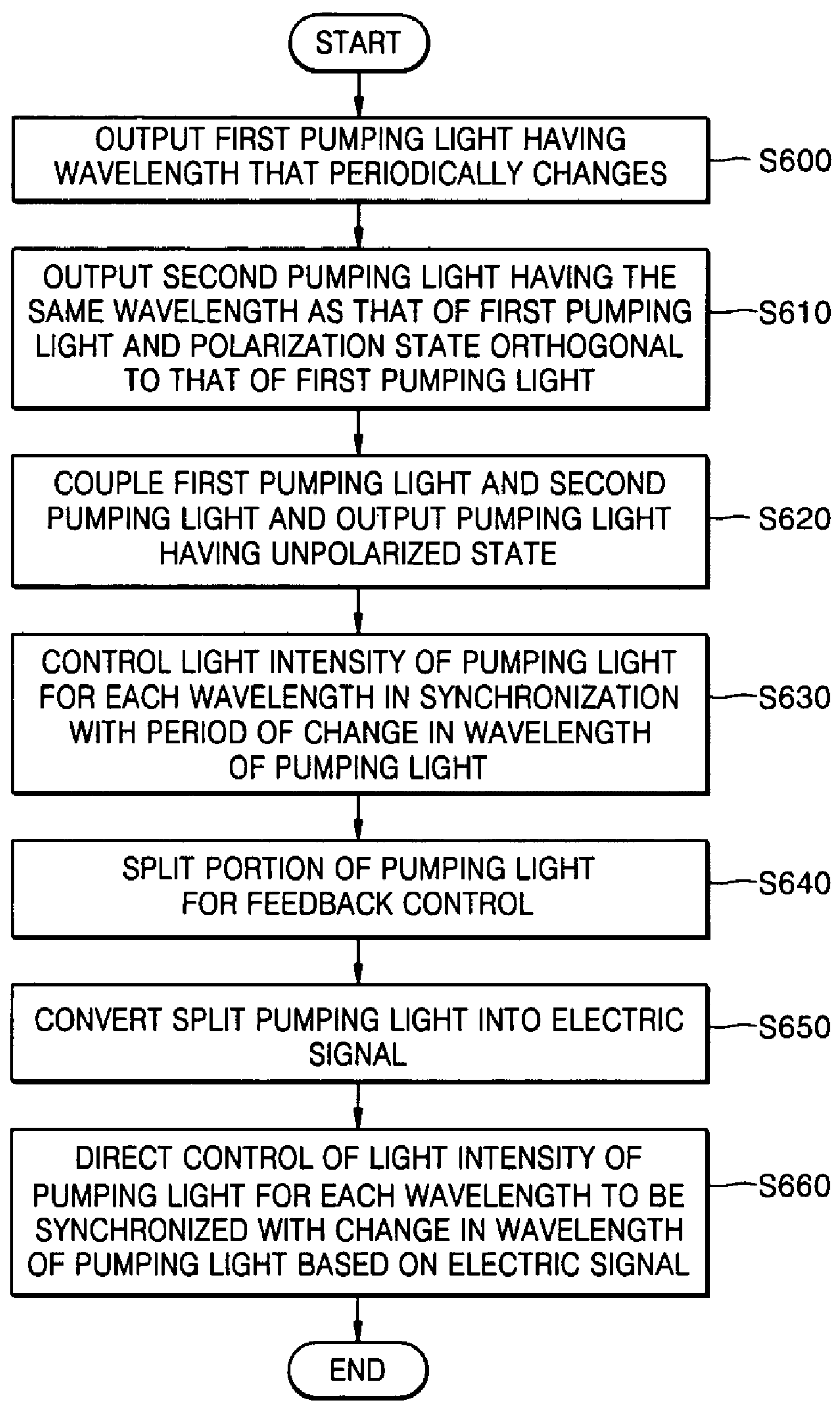
FIG. 6 is a flowchart illustrating a Raman pumping method according to the present invention.

FIG. 6 is a flowchart illustrating a Raman pumping method according to the present invention.

Referring to FIG. 6, the first light source unit 402 of the light source unit 400 outputs first pumping light having a wavelength that periodically changes in step S600. In step S610, the second light source unit 404 of the light source unit 400 outputs second pumping light that has the same wavelength as that of the first pumping light and has a polarization state orthogonal to that of the first pumping light. In step S620, the polarized light beam coupler 406 couples the first pumping light and the second pumping light and outputs pumping light having an unpolarized state.

In step S630, the light intensity control unit 510 varies the light intensity of the pumping light at each wavelength in synchronization with changes in the wavelength of the pumping light. In step S640, the tap 530 splits a portion of the pumping light and transmits the split portion to the light detection unit 540.

In step S650, the light detection unit 540 converts the input pumping light into an electric signal and outputs the electric signal to the control unit 520. In step S660, the control unit 520 controls the light intensity control unit 510 to vary the light intensity of the pumping light based on the electric signal.

According to the present invention, it is possible to obtain a flat Raman gain over a wide signal bandwidth by changing the wavelength of the pump laser at a predetermined interval and controlling the light intensity caused by the change in the wavelength in synchronization with changes in the wavelength.

Also, according to the present invention, the wavelength of the pumping light can be used, regardless of whether it is discretely or continuously changed.

While the present invention has been particularly shown and described with reference to exemplary embodiments thereof, it will be understood by those of ordinary skill in the art that various changes in form and details may be made therein without departing from the spirit and scope of the invention as defined by the appended claims and their equivalents.

What is claimed is:

1. A Raman amplifier comprising:

a light source unit, which outputs a pumping light having a wavelength that periodically changes;

a light intensity control unit, which varies the light intensity of the pumping light to improve the gain flatness of a Raman gain generated by the pumping light over a signal bandwidth;

a control unit, which controls the light intensity control unit to vary the light intensity of the pumping light in synchronization with a change in the wavelength of the pumping light, a tap, which splits a portion of the pumping light output from the light intensity control unit; and a light detection unit, which converts the split portion of the pumping light into an electric signal, wherein the control unit outputs a control signal for controlling the light intensity of the pumping light based on the electric signal.

2. A Raman amplifier comprising:

a light source unit, which outputs a pumping light having a wavelength that periodically changes;

a light intensity control unit, which varies the light intensity of the pumping light to improve the gain flatness of a Raman gain generated by the pumping light over a signal bandwidth;

a control unit, which controls the light intensity control unit to vary the light intensity of the pumping light in synchronization with a change in the wavelength of the pumping light, wherein the light source unit comprises:

a first light source unit, which outputs a first pumping light having a wavelength that periodically changes;

a second light source unit, which outputs a second pumping light having the same wavelength as that of the first pumping light and a polarization state orthogonal to that of the first pumping light; and a polarized light beam coupler, which couples the first pumping light and the second pumping light and outputs a pumping light having an unpolarized state.

3. A Raman pumping method comprising:

outputting a pumping light having a wavelength that periodically changes;

varying the light intensity of the pumping light according to the wavelength to improve the gain flatness of Raman gain caused by the pumping light over a signal bandwidth;

controlling the varying of the light intensity of the pumping light to be synchronized with changes in the wavelength of the pumping light, splitting a portion of the pumping light having the controlled light intensity; and converting the split portion of the pumping light into an electric signal, wherein controlling the varying of the light intensity comprises outputting a control signal that controls the light intensity of the pumping light based on the electric signal.

4. A Raman pumping method comprising:

outputting a pumping light having a wavelength that periodically changes;

varying the light intensity of the pumping light according to the wavelength to improve the gain flatness of Raman gain caused by the pumping light over a signal bandwidth;

controlling the varying of the light intensity of the pumping light to be synchronized with changes in the wavelength of the pumping light, wherein the outputting the control signal comprises:

outputting a first pumping light having a wavelength that periodically changes;

outputting a second pumping light having the same wavelength as that of the first pumping light and a polarization state orthogonal to that of the first pumping light; and coupling the first pumping light and the second pumping light and outputting a pumping light having an unpolarization state.

* * * * *